United States Patent
Gaddam et al.

(10) Patent No.: US 11,716,200 B2
(45) Date of Patent: Aug. 1, 2023

(54) TECHNIQUES FOR PERFORMING SECURE OPERATIONS

(71) Applicant: Visa International Service Association, San Francisco, CA (US)

(72) Inventors: Sivanarayana Gaddam, Santa Clara, CA (US); Rohit Sinha, San Jose, CA (US); Atul Luykx, San Francisco, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/956,702

(22) Filed: Sep. 29, 2022

(65) Prior Publication Data
US 2023/0020190 A1 Jan. 19, 2023

Related U.S. Application Data

(63) Continuation of application No. 17/051,715, filed as application No. PCT/US2019/028963 on Apr. 24, 2019, now Pat. No. 11,502,837.
(Continued)

(51) Int. Cl.
*H04L 9/32* (2006.01)
*H04L 9/08* (2006.01)
(Continued)

(52) U.S. Cl.
CPC ............ *H04L 9/321* (2013.01); *G06F 21/602* (2013.01); *H04L 9/0861* (2013.01); *H04L 9/16* (2013.01);
(Continued)

(58) Field of Classification Search
CPC ......... H04L 9/321; H04L 9/0861; H04L 9/16; H04L 9/3226; H04L 9/3247; H04L 9/3268; G06F 21/602
See application file for complete search history.

(56) References Cited

U.S. PATENT DOCUMENTS

2002/0174030 A1  11/2002  Praisner et al.
2010/0312657 A1  12/2010  Coulter et al.
(Continued)

FOREIGN PATENT DOCUMENTS

WO       2016195764 A1    12/2016

OTHER PUBLICATIONS

"EMV 2nd Generation Acceptance System", Book 11, Secure Channel Manager, vol. 0.8.5, Nov. 22, 2017, pp. 1-179.
(Continued)

*Primary Examiner* — Darshan I Dhruv
(74) *Attorney, Agent, or Firm* — Kilpatrick Townsend & Stockton LLP

(57) ABSTRACT

The system and methods described herein may be utilized to perform operations in a faster and less complex manner than provided by conventional systems. An encrypted record may be stored at a user device. The encrypted record may include entries related to operations that were previously requested by the user device. The encrypted record may have been encrypted using a dynamic value and a key that is associated with an entity associated with the user. A recipient computer of a request by the user device may be configured to utilize the dynamic value provided in the request and the key associated with the entity to derive the encryption key(s) last used to encrypt the record. The recipient computer may decrypt and modify the decrypted record to perform the requested operation while the user device is precluded from doing so.

21 Claims, 6 Drawing Sheets

Related U.S. Application Data

(60) Provisional application No. 62/664,675, filed on Apr. 30, 2018.

(51) Int. Cl.
  *H04L 9/06* (2006.01)
  *G06F 21/60* (2013.01)
  *H04L 9/16* (2006.01)

(52) U.S. Cl.
  CPC .......... *H04L 9/3226* (2013.01); *H04L 9/3247* (2013.01); *H04L 9/3268* (2013.01)

(56) References Cited

U.S. PATENT DOCUMENTS

| | | | | |
|---|---|---|---|---|
| 2014/0074724 | A1* | 3/2014 | Gordon | G06Q 20/10 705/44 |
| 2014/0188738 | A1 | 7/2014 | Huxham | |
| 2015/0088756 | A1* | 3/2015 | Makhotin | G06Q 20/32 705/71 |
| 2016/0028550 | A1* | 1/2016 | Gaddam | H04L 63/0823 713/173 |
| 2017/0346807 | A1* | 11/2017 | Blasi | H04L 63/0807 |
| 2018/0007037 | A1* | 1/2018 | Reese | H04L 63/0838 |
| 2018/0047023 | A1* | 2/2018 | Bou | G06Q 20/20 |
| 2019/0260723 | A1* | 8/2019 | Manges | H04L 63/061 |
| 2019/0268149 | A1* | 8/2019 | Kariv | H04L 9/0897 |

OTHER PUBLICATIONS

"EMV 3-D Secure", SDK Technical Guide, vol. 2.1.0, Oct. 31, 2017, pp. 1-71.
U.S. Appl. No. 17/051,715, First Action Interview Pilot Program Pre-Interview Communication, dated May 11, 2022, 5 pages.
U.S. Appl. No. 17/051,715, Notice of Allowance, dated Aug. 9, 2022, 25 pages.
Au et al., "Practical Compact E-Cash", IACR, International Association for Cryptologic Research, Apr. 25, 2007, pp. 1-16.
Application No. EP19795928.1, Extended European Search Report, dated May 26, 2021, 10 pages.
Application No. PCT/US2019/028963, International Preliminary Report on Patentability, dated Nov. 12, 2020, 7 pages.
Application No. PCT/US2019/028963, International Search Report and Written Opinion, dated Sep. 6, 2019, 11 pages.

* cited by examiner

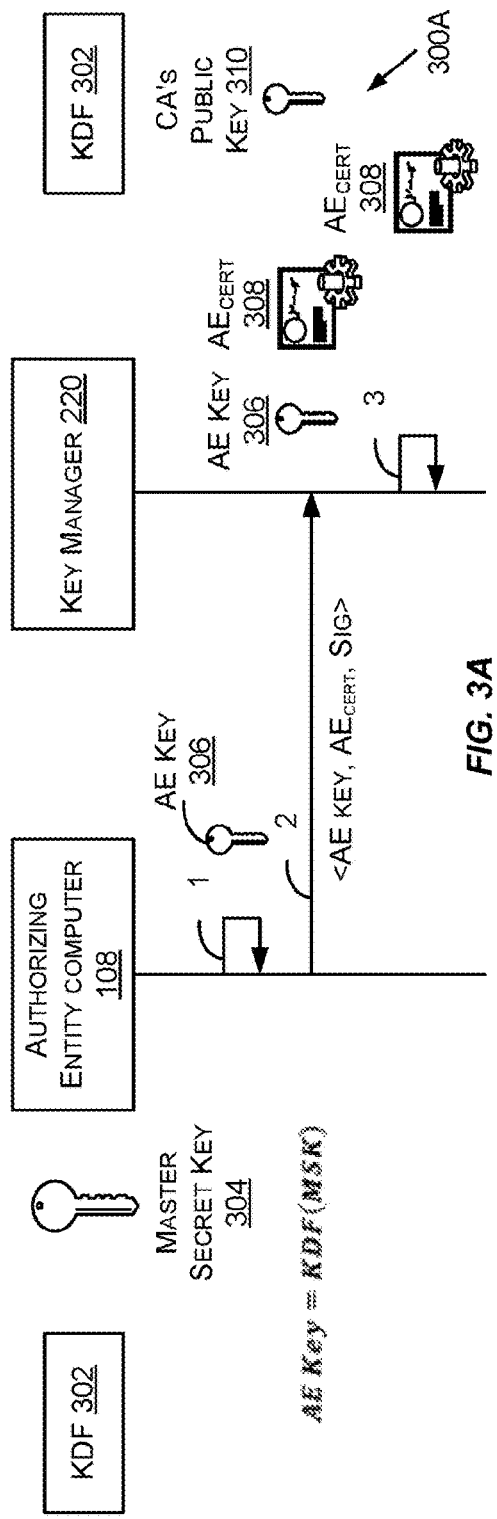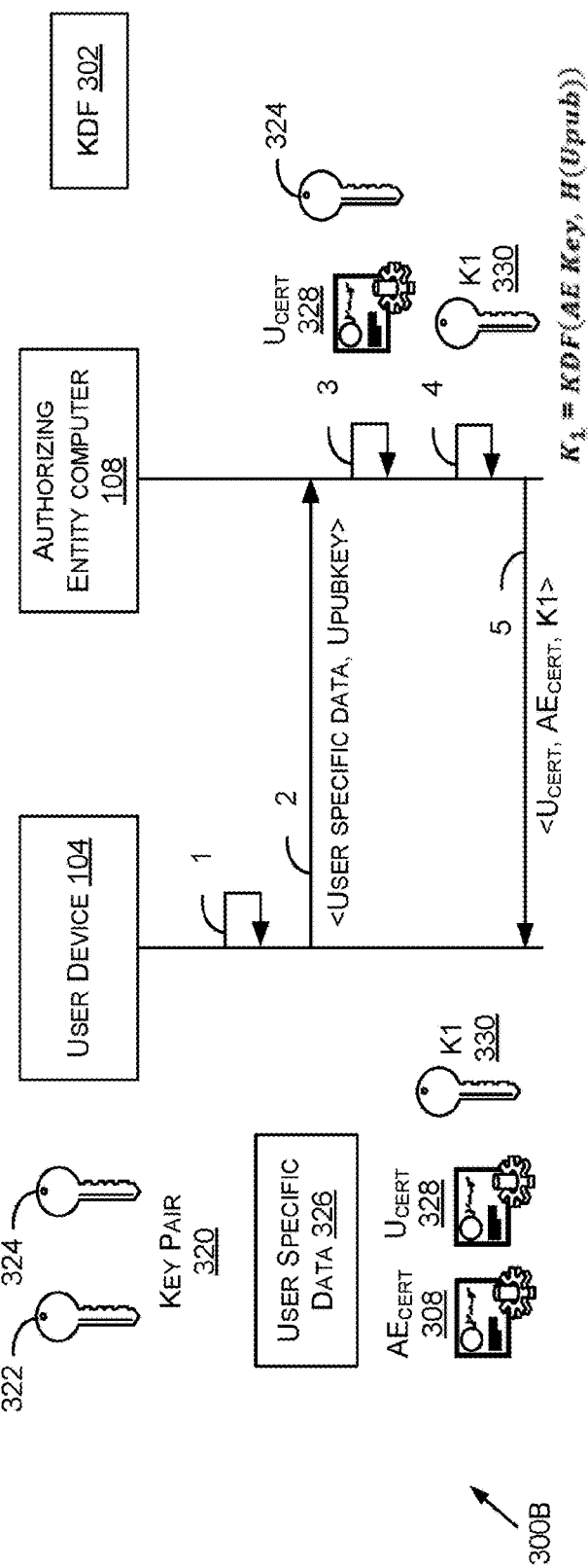

| | | | |
|---|---|---|---|
| 1 | 100 | $AE_{PUB\_KEY}$ | $UD_{PUB\_KEY}$ | $AE_{SIG}$ |
| 2 | 10 | $AE_{PUB\_KEY}$ | $UD_{PUB\_KEY}$ | RPUB_KEY 1 |
| 3 | 20 | $AE_{PUB\_KEY}$ | $UD_{PUB\_KEY}$ | $AE_{SIG}$ |
| 4 | 30 | $AE_{PUB\_KEY}$ | $UD_{PUB\_KEY}$ | RPUB_KEY 2 |
| . . . | | | |

TECHNIQUES FOR PERFORMING SECURE OPERATIONS

CROSS-REFERENCE TO RELATED APPLICATIONS

This application is a Continuation of U.S. patent application Ser. No. 17/051,715, filed on Oct. 29, 2020, which is a 371 Application of International Patent Application No. PCT/US2019/028963 filed on Apr. 24, 2019, and claims priority to U.S. Provisional Patent Application No. 62/664,675, filed on Apr. 30, 2018, the disclosures of which are herein incorporated by reference in their entirety for all purposes.

BACKGROUND

Conventional authorization systems typically require authorization request messages to be transmitted through a resource provider computer, to a transport computer to a processing network computer. The processing network computer is conventionally configured to route the message to an authorizing entity computer for authorization processing. This conventional transmission path includes an amount of inherent latency. Improvements may be made to reduce the latency of authorization systems while maintaining a high degree of security.

Embodiments of the invention address these and other problems individually and collectively.

SUMMARY

One embodiment of the invention is directed to a method comprising receiving, from a requesting device, a request to perform an operation. In some embodiments, the request is received in a request message comprising an encrypted record and a first dynamic value. The encrypted record may comprise a set of one or more entries corresponding to one or more previously performed operations associated with a user of the requesting device. The method may further comprise authorizing the request using the encrypted record, a first cryptographic key derived from a unique key associated with an authorizing entity, and a first dynamic value. The method may further comprise performing one or more operations based at least in part on the request being authorized. The method may further comprise generating a modified encrypted record comprising data associated with the one or more operations performed. The method may further comprise transmitting, to the requesting device, at least the modified encrypted record and an indication that the operation was performed.

Another embodiment of the invention is directed to a secure processing computer comprising one or more processors and one or more memories storing executable instructions that, when executed by the one or more processors, cause the secure processing computer to perform the method above. In some embodiments, the one or memories comprise a first secure memory space and a second secure memory space. The first secure memory space may store code that, when executed by the one or more processors, causes the secure processing computer to derive and generate one or more cryptographic keys. In some embodiments, the second secure memory space stores code that, when executed by the one or more processors, causes the secure processing computer to decrypt the encrypted record to generate a decrypted record and perform authorization processing utilizing the decrypted record. In some embodiments, the first secure memory space and the second secure memory space may be the same secure memory space.

Another embodiment of the invention is directed to an authorizing entity computer comprising one or more processors and one or more memories storing executable instructions that, when executed by the one or more processors, cause the authorizing entity computer to perform a method. The method may comprise generating a unique key associated with an authorizing entity. The method may further comprise receiving, from a user device, a first request to perform a first operation. In some embodiments, the first request may be received in a first request message comprising a first cryptographic key derived from the unique key. The method may further comprise performing the first operation based at least in part on the first request. The method may further comprise generating a record corresponding to a user associated with the first request. In some embodiments, the record may comprise a record entry indicating that the first operation was performed. The method may further comprise generating a second cryptographic key based at least in part on the unique key and a first dynamic value. The method may further comprise generating an encrypted record based at least in part on the record, the first cryptographic key, and the second cryptographic key. The method may further comprise transmitting, to the user device, the encrypted record, the first dynamic value, and an indication that the first operation was performed.

Another embodiment of the invention is directed to a user device comprising one or more processors and one or more memories storing executable instructions that, when executed by the one or more processors, cause the user device to perform a method. The method may comprise storing, in the one or more memories, a first cryptographic key associated with an authorizing entity. In some embodiments, the first cryptographic key may be derived from a unique key associated with the authorizing entity. The unique key may be unknown to the user device. The method may further comprise receiving user input indicating a first operation is requested. The method may further comprise transmitting, to an authorizing entity computer, a first request to perform the first operation. In some embodiments, the first request may be transmitted in a first request message comprising the first cryptographic key. The method may further comprise receiving a first response to the first request, the first response being received in a response message comprising a first encrypted record, an indication that the first operation was performed, and a first dynamic value associated with the first encrypted record. The method may further comprise displaying data indicating that the first operation was performed. The method may further comprise storing the first encrypted record and the first dynamic value in the one or more memories of the user device.

These, and other embodiments of the invention, are discussed in further detail below.

BRIEF DESCRIPTION OF THE DRAWINGS

FIGS. 3A and 3B each illustrate an enrollment process, according to some embodiments.

FIG. 5 illustrates and exemplary clear text record, according to some embodiments.

DETAILED DESCRIPTION

Figure 1:
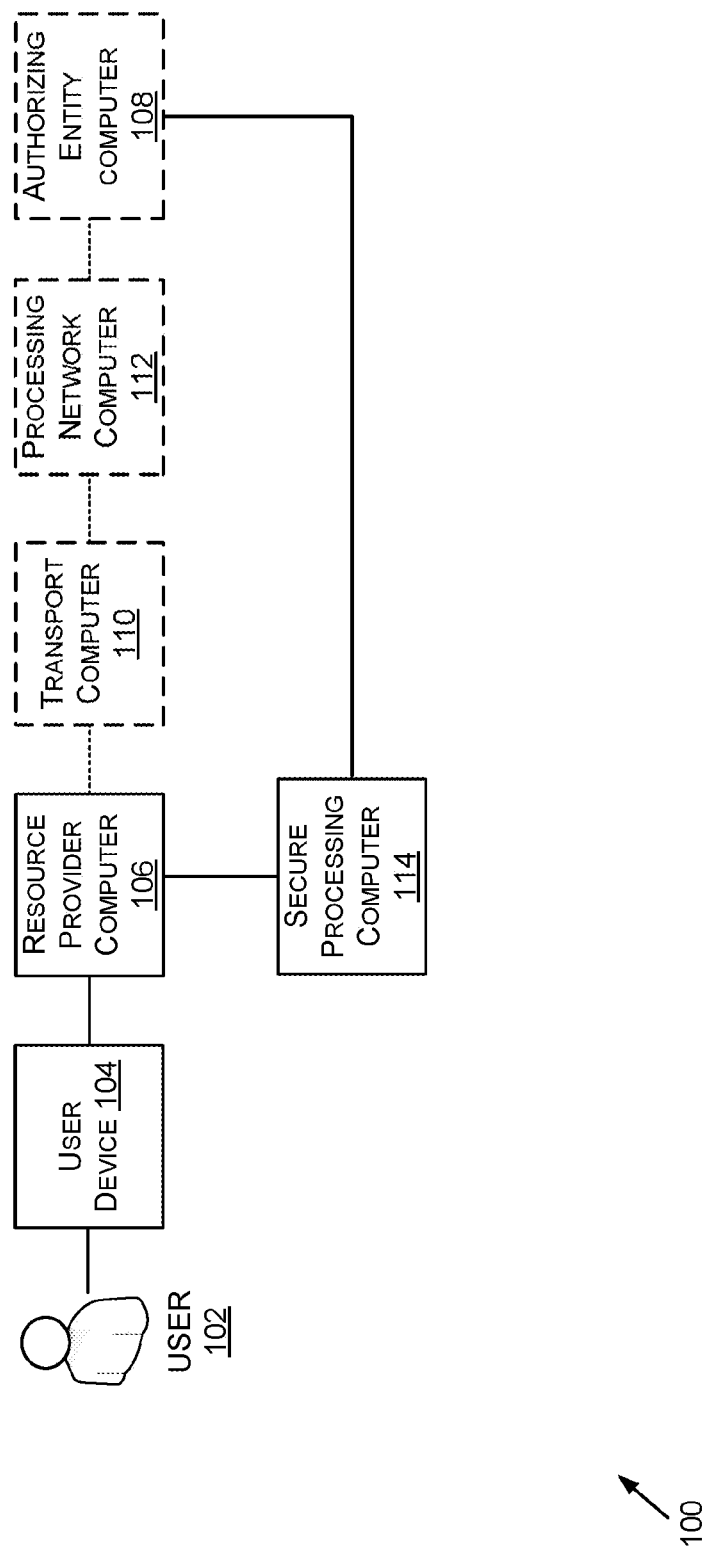
FIG. 1 shows a block diagram of two authorization systems and a method that can be used to reduce latency in authorization processing, according to some embodiments of the invention.

Embodiments of the invention may provide exemplary systems, devices, and methods for performing authorization processing and related activities. Although reference may be made to transactions of a payment system in the examples provided below, embodiments are not so limited. That is, the systems, methods, and apparatuses described herein may be utilized for any suitable purpose.

Prior to discussing embodiments of the invention, description of some terms may be helpful in understanding embodiments of the invention.

A "server computer" may typically be a powerful computer or cluster of computers. For example, the server computer can be a large mainframe, a minicomputer cluster, or a group of servers functioning as a unit. In one example, a server computer may be a database server coupled to a Web server. The server computer may be associated with an entity such as a merchant, payment processing network, a wallet provider, a merchant, an authentication cloud, an acquirer, or an issuer.

A "user device" may be any suitable electronic device that can process and communicate information to other electronic devices. The user device may include a processor and a computer readable medium coupled to the processor, the computer readable medium comprising code, executable by the processor. The user device may also each include an external communication interface for communicating with each other and other entities. Examples of user devices may include a mobile device, a laptop or desktop computer, a wearable device, a vehicle with remote communication capabilities, etc.

"A resource provider" may be an entity that may make resources available to a user. Examples of resource providers include merchants, vendors, suppliers, owners, traders, and the like. In some embodiments, such entities may be a single individual, small groups of individuals, or larger groups of individuals (e.g., companies). Resource providers may be associated with one or more physical locations (e.g., supermarkets, malls, stores, etc.) and online platforms (e.g., mobile applications, e-commerce websites, online companies, etc.). In some embodiments, resource providers may make available physical items (e.g., goods, products, etc.) to the user. In other embodiments, resource providers may make available (e.g., provide access to) digital resources (e.g., electronic documents, electronic files, etc.) to the user. In other embodiments, resource provider may manage access to certain resources (e.g., password, code, etc.) by the user.

A "resource provider computing device" may include any system associated with a resource providing entity. In some embodiments, the resource provider computer may handle functionality of a mobile application and/or a website associated with the resource providing entity from which a user may conduct an online transaction. The resource provider computing device may also be known as a "resource provider computer." A "resource provider computer" may be any suitable computing device that may be operated by, or on behalf of, a resource provider.

A "communication device" may be an example of a "user device" and may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "user" may include an individual. In some embodiments, a user may be associated with one or more personal accounts and/or mobile devices. The user may also be referred to as a cardholder, account holder, or consumer in some embodiments.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An "authorizing entity computer" may be any suitable computing device that may be operated by, or on behalf of, an authorizing entity.

An "issuer" may typically refer to a business entity (e.g., a bank) that maintains an account for a user. An issuer may also issue payment credentials stored on a user device, such as a cellular telephone, smart card, tablet, or laptop to the consumer. An issuer may be an example of an authorizing entity.

A "record" may be a container for data. A record may be a list, a database, or the record may be in any suitable form. An "encrypted record" refers to a record that has been encrypted using any suitable cryptographic algorithm. "Encryption," refers to a process for converting data into a code to prevent unauthorized access. Encryption, as used herein, may include providing input to any suitable encryption algorithm to obtain an encrypted version of the input. Similarly, "decryption," is a process of converting encrypted code to data to enable access to the data. Decryption, as used herein, may include providing input to any suitable decryption algorithm to obtain a decrypted version of the input.

A "processing network computer" may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

An "authorization request message" may be an electronic message that is sent to a transaction processing computer and/or an authorizing entity computer (e.g., issuer of a payment card) to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an authorizing entity computer or a processing network computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing entity (e.g., an issuer bank) returns in response to an authorization request message in an electronic message (either directly or through the transaction processing computer) to a resource provider computer that indicates approval of the transaction. The code may serve as proof of authorization. In some embodiments, a processing network computer may generate or forward the authorization response message to the resource provider.

A "digital signature" may include a value that may be utilized to verify the authenticity of digital data. A valid digital signature may give a recipient reason to believe the data was created by a known entity, that the creator cannot deny having created the data, and that the data has not been altered.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

In the examples below, various encryption and decryption processes are described. Suitable encryption and/or decryption processes may include the use of AES, DES, triple DES, etc.

In the examples below, payments are discussed as an exemplary use case. However, it is understand that the methods and systems may be used in other contexts including the access to secure data over a network, or any other suitable interaction between two entities.

FIG. 1 shows a block diagram an exemplary authorization system 100 and a method that can be used to reduce latency in authorization processing, according to some embodiments of the invention. As shown in FIG. 1, a conventional authorization system may comprise a number of components. By way of example, a conventional authorization system may comprise a user (e.g., the user 102) that can operate a user device 104. The user 102 may use the user device 104 to pay for a good or service website hosted by the resource provider computer 106. The resource provider computer 106 may be operated by, or on behalf of, a resource provider (e.g., a merchant). It should be appreciated that a website associated with the resource provider may be hosted by a computing device (not shown) that is separate from, but in communication with, the resource provider computer 106. The resource provider computer 106 may communicate with an authorizing entity computer (e.g., the authorizing entity computer 108) operated by, or on behalf of an authorizing entity (e.g., an issuer), via a transport computer (e.g., the transport computer 110) operated by, or on behalf of, an acquirer and a processing network computer (e.g., the processing network computer) operating as part of a processing network (e.g., a payment processing network).

The processing network may include data processing subsystems, networks, and operations used to support and deliver authorization services, exception file services, and clearing and settlement services. An exemplary processing network may include VisaNet™. Processing networks such as VisaNet™ are able to process credit card transactions, debit card transactions, and other types of commercial transactions. VisaNet™, in particular, includes a VIP system (Visa Integrated Payments system) which processes authorization requests and a Base II system that performs clearing and settlement services. The processing network may use any suitable wired or wireless network, including the Internet.

A conventional authorization flow using a user device 104 can be described as follows. The user device 104 may interact with a website or other external interface provided/hosted by the resource provider computer 106 to initiate a request to perform an operation (e.g., a request for a transaction to be authorized). By way of example, the user device 104 may initiate a transaction (e.g., a payment transaction) at the website or external interface provided by the resource provider computer 106. The user device 104 may provide, among other things, transaction data (e.g., a transaction amount, payment data, and the like) with which the transaction is to be performed. Payment data may include an account number, an expiry date, a code, a password, a PIN, or the like.

The resource provider computer 106 may receive this transaction data from the user device 104 via an external communication interface. The resource provider computer 106 may then generate an authorization request message that includes at least a portion of the information received from the user device 104 and electronically transmits this message to a transport computer 110. The transport computer 110 may then receive, process, and forward the authorization request message to a processing network computer 112 for authorization.

In general, prior to the occurrence of a credit or debit-card transaction, the processing network computer 112 has an established protocol with each issuer on how the issuer's transactions are to be authorized. In some cases, such as when the transaction amount is below a threshold value, the processing network computer 112 may be configured to authorize the transaction based on information that it has about the user's account without generating and transmitting an authorization request message to the authorizing entity computer 108. In other cases, such as when the transaction amount is above a threshold value, the processing network computer 112 may receive the authorization request message, determine the authorizing entity associated with the user device 104 (or an account associated with the user 102), and forward the authorization request message for the transaction to the authorizing entity computer 108 for verification and authorization. Once the transaction is authorized, the authorizing entity computer 108 may generate an authorization response message (that may include an authorization code indicating the transaction is approved or declined) and transmit this electronic message via its external communication interface to processing network computer 112. The processing network computer 112 may then forward the authorization response message to the transport computer 110, which in turn may then transmit the electronic message to comprising the authorization indication to the resource provider computer 106, and then, in some cases, to the user device 104.

At the end of the day or at some other suitable time interval, a clearing and settlement process between the resource provider computer 106, the transport computer 110, the processing network computer 112, and/or the authorizing entity computer 108 may be performed for the transaction.

In some embodiments, the authorization system 100 may comprise the user 102, the user device 104, the resource provider computer 106, the authorizing entity computer 108, and a secure processing computer 114. The secure processing computer may, in some cases, be one of many secure processing computers. For example, the secure processing computer 114 may be initiated and/or operated by, or on behalf of, the authorizing entity computer 108. Any suitable number of instances of the secure processing computer 114 may be utilized in authorization system 100. For example, one instance of the secure processing computer 114 may be configured to manage operations (e.g., authorizing a transaction, authorizing an operation, etc.) involving a particular authorizing entity (e.g., financial institution 1), while another instance of the secure processing computer 114 may be configured to manage operations involving another authorizing entity (e.g., financial institution 2). A mapping between an account number range and an address of the secure processing computer 114 configured to perform operations associated with a particular authorizing entity associated with that account number range may be maintained at any suitable location. For example, the resource provider computer 106 may be configured to store such a mapping. The resource provider computer 106 may be configured to utilize the mapping to route a request to perform an operation (e.g., via a request message, via an authorization request message) to the secure processing computer 114 associated with the authorizing entity corresponding to the request (e.g., the authorizing entity that manages an account associated with the user 102).

Utilizing the techniques discussed herein, an authorization system 100 may omit routing through the conventional authorization paths including the transport computer 110, processing network computer 112, and authorizing entity computer 108. For example, in some embodiments, an authorization request message would no longer need to be transmitted to the transport computer 110, the processing network computer 112, and the authorizing entity computer 108 as required by conventional systems. Similarly, an authorization response message would no longer need to be transmitted from the authorizing entity computer 108, to the processing network computer 112, to the transport computer 110 in order to be received by the resource provider computer 106. As shown, a request for to perform an operation such as an authorization of a transaction (e.g., a load operation, a spend operation) may be transmitted (e.g., via an authorization request message) directly to a trusted computer (e.g., the secure processing computer 114), and an authorization can occur in a secure and trusted manner directly with that trusted computer. Similarly, a response (e.g., an authorization response message) may be transmitted, by the secure processing computer 114, directly to the resource provider computer 106 rather than through the conventional response path. As a result, embodiments disclosed herein can be performed much faster than conventional authorization systems.

At the end of the day or at some other suitable time interval, a clearing and settlement process between the resource provider computer 106, the transport computer 110, the processing network computer 112, and/or the authorizing entity computer 108 may be performed for the transaction.

Figure 2:
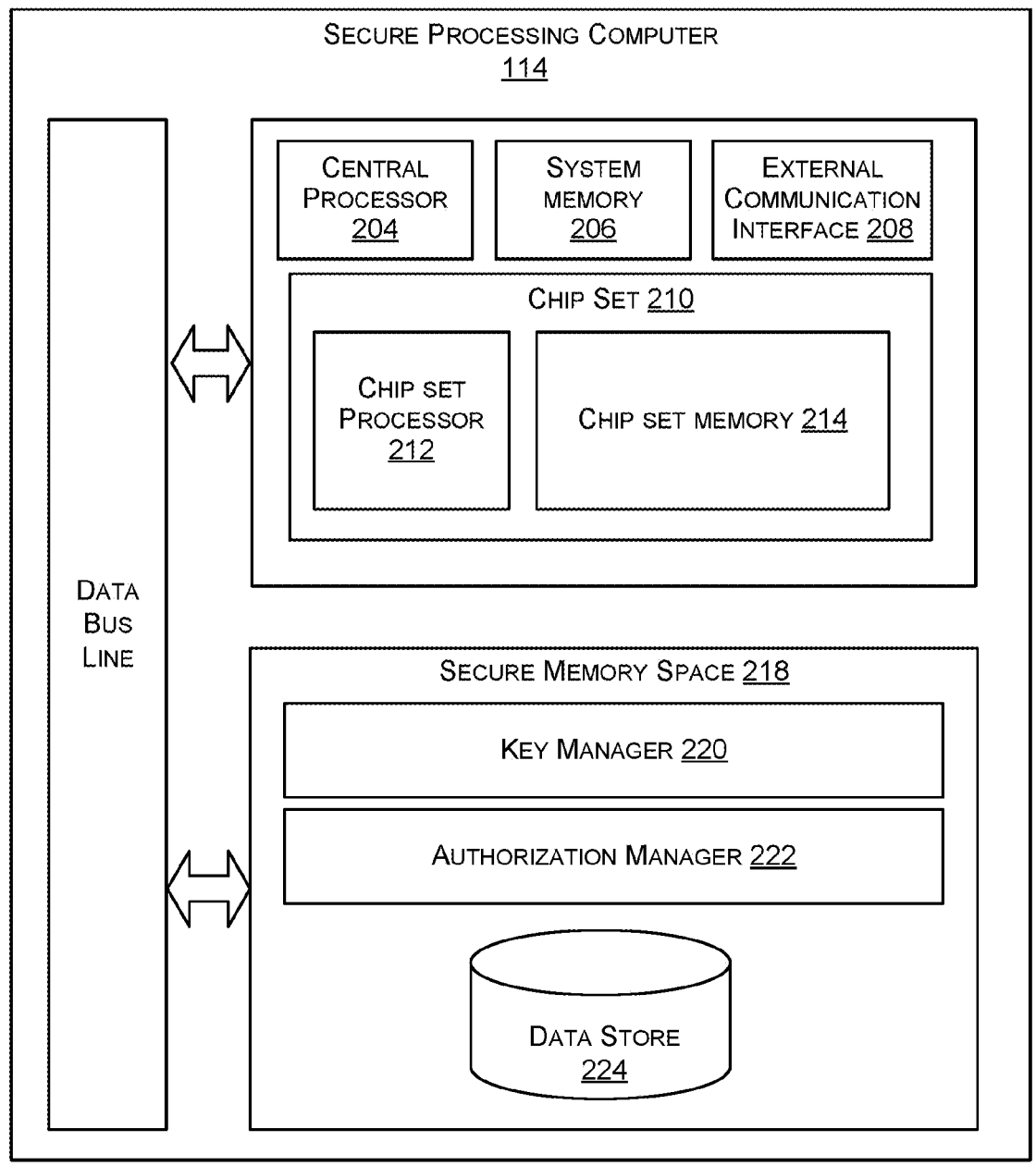
FIG. 2 illustrates a block diagram of a secure processing computer, in accordance with at least one embodiment.

FIG. 2 illustrates a block diagram of the secure processing computer 114 of FIG. 1, in accordance with at least one embodiment.

The secure processing computer 114 may include a central processor 204. The central processor 204 may be coupled to a system memory 206 and an external communication interface 208. The secure processing computer 114 may include chip set 210. The chip set 210 may include a chip set processor 212 that may be coupled with chip set memory 214. The chip set memory 214 may be configured to store chip set instructions (e.g., firmware or configuration logic) for performing functionality described herein with respect to chip set operations.

Chip set memory 214 may include code, executable by the chip set processor 212, for initializing and managing one or more secure memory spaces, such as secure memory space 218 (e.g., an Intel SGX enclave). The secure memory space 218 may be operatively coupled to the chip set processor 212, and the secure memory space 218 may include the key manager 220 and/or the authorization manager 222. Although FIG. 5 depicts the key manager 220 and the authorization manager 222 as being stored in a single memory space (e.g., the secure memory space 218), it should be appreciated that the key manager 220 and the authorization manager 222 may be stored in separate memory spaces and not necessarily on the same secure processing computer. Accordingly, the key manager 220 may reside in a secure memory space on one secure processing computer, while the authorization manager 222 may reside on a different memory space on another secure processing computer. The chip set processor 212 may be configured to enforce access control protocols to restrict access to the secure memory space 218. Utilizing these access control protocols, the chip set processor 212 may restrict access to the secure memory space 218 such that only software components (e.g., the key manager 220, authorization manager 222, etc.) of the secure memory space 218 may access content may access content (e.g., the data store 224) within the secure memory space 218. In at least one embodiment, the data store 224 may be configured to store one or more cryptographic keys as discussed in more detail below. In this manner, the secure memory space 218 can be inaccessible to all other software running on the secure processing computer 114 including the operating system of the secure processing computer 114.

The data store 224 may be implemented using various data structures, such as an array, hash map, (linked) list, structured text file (e.g., XML), table, and/or the like. Such data structures may be stored in memory and/or in structured files. The data store 224 may be configured to reside within the secure memory space 218. Access to the data store 224 may be performed according to access control protocols enforced by the chip set processor 212. In some embodiments, the data store 224 may be configured to store one or more cryptographic keys. The chip set processor 212, when executing code contained in the ship set memory 214, may enforce access control to the data store 224 such that content of the data store 224 is accessible by the chip set processor 212 via execution of function calls of the key manager 220, and inaccessible by any other means.

The chip set memory 214 can include code that, when executed by the chip set processor 212 can create and manage secure memory spaces such one or more instances of the secure memory space 218. In some embodiments, the central processor 204 may initially load code and data of the key manager 220 and/or the authorization manager 222. During initialization, or another suitable time, the central processor 204 may transmit a secure memory space request to the chip set processor 212. Upon receipt, the chip set processor 212 can execute instructions stored in chip set memory 214 to initialize and configure the secure memory space 218. In some embodiments, the chip set processor 212 may then copy code and data of the key manager 220 and/or authorization manager 222 from unprotected memory (e.g., not depicted) into the secure memory space 218. The chip set processor 512 may then be configured to encrypt (e.g., cryptographically hash) the contents of the secure memory space 218 using an encryption key stored in chip set memory 214 and accessible only by the chip set processor 212. In some embodiments, the encryption key may be hard-coded into the chip set memory 214. The encryption ensures that the code and data stored in the secure memory space 218 cannot be accessed by other software, including system software, or other devices. In some embodiments, the chip set processor 212 can support multiple secure memory spaces at a time. The secure memory space 218 may alternatively be referred to as "an enclave." It should be appreciated that, in some embodiments, the functionality of the chip set processor 212 may alternatively be performed by the central processor 204 utilizing security-related instruction code that is built into the central processor 204. One example of such code may include Intel Software Guard Extensions.

In some embodiments, the key manager 220 may comprise code that, when executed by the chip set processor 212, causes the key manager 220 to receive a cryptographic key (e.g., from an authorizing entity computer such as the authorizing entity computer 108 of FIG. 1). The cryptographic key may be received via an enrollment request message during an enrollment process performed with an authorizing entity computer. The enrollment request message may have any suitable format and may include at least the cryptographic key and identification data associated with the authorizing entity (e.g., a name of the authorizing entity, a public key associated with the authorizing entity, a certificate associated with the authorizing entity, etc.). The cryptographic key may be unique to the authorizing entity. The key manager 220 may be configured to cause the chip set processor 212 to store any suitable number of received cryptographic keys in the data store 224. In some embodiments, each cryptographic key may correspond to a particular authorizing entity (e.g., a particular financial institution). In some cases, the key manager 220 may be configured to cause the chip set processor 212 to transmit an enrollment response message in response to receiving and/or storing the cryptographic key. By way of example, the key manager 220 may cause the chip set processor 212 to transmit any suitable data to a sender of the cryptographic key (e.g., an authorizing entity computer) that the cryptographic key was successfully received and/or enrolled/stored. The key associated with the authorizing entity may be considered to be enrolled once the cryptographic key associated with the authorizing entity is stored in the data store 224.

In some embodiments, the key manager 220 may be configured to cause the chip set processor 212 to receive requests for cryptographic key generation (e.g., from the authorization manager 222 as described in connection with FIG. 6). In response to a request, the chip set processor 212 may generate one or more cryptographic keys according to the methods discussed herein. In some embodiments, the key manager 220 may be configured to cause the chip set processor 212 to execute a key derivation function with particular input to generate a cryptographic key as described in the following figures. In some embodiments, the key manager 220 may be communicatively coupled to the authorization manager 222 and the functionality of the key manager 220 may be stimulated via one or more function calls from the authorization manager 222. Upon generating the cryptographic key, the key manager 220 may cause the chip set processor 212 to return the cryptographic key to the requesting device/component (e.g., the authorization manager 222).

In some embodiments, the key manager 220 may be configured to cause the chip set processor 212 to receive one or more digital certificates (e.g., as part of a request for cryptographic key generation or otherwise) and to perform any suitable verification techniques described in connection with FIGS. 3, 4, and 6 using the digital certificates to verify the identity of the entity/entities associated with the request (e.g., the user, the authorizing entity, the resource provider, etc.). The key manager 220 may further be configured to verify that a dynamic value received from the authorization manager 222 has not been previously used to generate a previously generated cryptographic key.

In some embodiments, the authorization manager 222 may be configured with code that, when executed by the chip set processor 212, causes the chip set processor 212 to receive and process requests to perform operations. In some embodiments, a request to perform an operation (e.g., request to authorize a transaction to spend $10 at a particular merchant) may be formatted as an authorization request message. These requests may initiated by the user device (e.g., the user device 104) and received by the authorization manager 222 from a resource provider computer (e.g., the resource provider computer 106 of FIG. 1). In some embodiments, receipt of an authorization request message may be considered a request to perform an operation. The authorization request message may include a payload that comprises an encrypted record associated with a user (e.g., the user 102 of FIG. 1). In some embodiments, the encrypted record may further be associated with an authorizing entity (e.g., an authorizing entity that manages an account associated with the user). The encrypted record may include one or more entries indicating previous operations requested by the user device 104 and successfully performed by the authorizing entity computer 108 or an instance of an authorization manager 222. The payload may further include one or more digital certificates, a cryptographic key (e.g., a cryptographic key associated with an authorizing entity), an amount, a dynamic value, an address associated with the secure processing computer 114 with which the authorization request message is to be processed, or any suitable combination of the above. The authorization manager 222 may be configured to cause the chip set processor 212 to request and/or receive one or more cryptographic keys from the key manager 220. In some embodiments, the authorization manager 222 may be configured to generate any suitable number of dynamic values (e.g., a nonce, a random number, a counter that changes with each request, or the like).

In some embodiments, as part of an authorization process, the authorization manager 222 may be configured to cause the chip set processor 212 to decrypt a received encrypted record with one or more encryption keys received via the request message and/or the key manager 220. In some embodiments, the authorization manager 222 may be configured to cause the chip set processor 212 to aggregate common data fields associated with a set of entries of the decrypted record. As a non-limiting example, the record may include data entries corresponding to previously performed load operations and/or spend operations associated with the user 102. The authorization manager 222 may be configured to aggregate, for example, load values for all of the load operations of the record to determine a first value (e.g., a total value for all the load operations of the record). As another example, the authorization manager 222 may be configured to aggregate spend values for all of the spend operations of the record to determine a second value (e.g., a total value for all of the spend operations of the record). The authorization manager 222 may be configured to authorize the request when the first value is greater than or equal to a sum of the second value and the amount included in the request.

If the first value less than the sum of the second value and the amount included in the request, the authorization manager 222 may be configured to deny the request and a response message (e.g., an authorization response message) may be transmitted back to the requesting device (e.g., the resource provider computer 106). Otherwise, the authorization manager 222 may be configured to cause the chip set processor 212 to perform one or more operations corresponding to the request. By way of example, the authorization manager 222 may cause the chip set processor 212 to add/append to the record, data corresponding with and/or related to the request.

Once data has been added or appended to the record, the authorization manager 222 may be configured to cause the chip set processor 212 to request one or more additional encryption keys (e.g., from the key manager 220). The encryption keys may be derived/generated based at least in part on a unique key associated with the authorizing entity (e.g., the key received by the key manager 220 during an enrollment process performed with the authorizing entity computer 108) and a dynamic value generated by the authorization manager 222 or the key manager 220. For example, the encryption key(s) may be generated by submitting the using a key derivation function known to the secure processing computer 114 and the authorizing entity computer 108 of FIG. 1. Upon obtaining these encryption key(s), the authorization manager 222 may cause the chip set processor 212 to encrypt the record using the obtained encryption keys (or another encryption key generated from the obtained encryption keys). The authorization manager 222 may be configured to cause the chip set processor 212 to transmit, to the requesting device, the encrypted record and the dynamic value used to derive/generate at least one encryption key used to encrypt the record. In some embodiments, the encrypted record and the dynamic value may be transmitted via an authorization response message. The transmission may further include an indication that the request was authorized and/or the requested operation (e.g., an authorization operation) was performed.

FIGS. 3A and 3B each illustrate an enrollment method, according to some embodiments. FIG. 3A illustrates an exemplary enrollment method 300A performed by the authorizing entity computer 108 of FIG. 1 and the key manager 220 of FIG. 2. FIG. 3B illustrates an exemplary enrollment method 300B performed by the user device 104 of FIG. 1 and the authorizing entity computer 108.

It should be appreciated that, prior to the performance of method 300A, the authorizing entity computer 108 and the key manager 220 may both obtain and/or store a key derivation function (e.g., KDF 302). Accordingly, in the examples provided herein, the authorizing entity computer 108 and the key manager 220 may utilize the same key derivation function to derive one or more cryptographic keys. In some embodiments, the authorizing entity computer 108 may also have access to a master secret key 304. In some embodiments, the key manager 220 may be provisioned with the public key of a trusted certificate authority (not depicted).

Method 300A may begin at step 1, where the authorizing entity computer 108 may generate a key (e.g., AE key 306) using KDF 302. As a non-limiting example, the authorizing entity computer 108 may provide the master secret key 304 as input in the KDF 302 to generated AE key 306. In some embodiments, the master secret key 304 is known only to the authorizing entity. The following function describes the operation, where "AE key" is the AE key 306, "KDF" is KDF 302, and "MSK" is master secret key 304.

$$AE\ Key = KDF(MSK)$$

It should be appreciated that input may be utilized with KDF 302 to generate AE key 306. The AE key 306 may be generated to ensure that it is unique to the authorizing entity.

Utilizing the master secret key 304 as input in KDF 302 is one example of how uniqueness is achieved as the master secret key 304 is also unique to the authorizing entity, thus, the output of KDF 302 (e.g., AE key 306) would also be unique to the authorizing entity. Utilizing the AE key 306 generated from the master secret key 304 ensures uniqueness while also alleviating the authorizing entity from communicating its master secret key 304, which would likely be a security risk.

At step 2, the authorizing entity computer 108 may transmit the AE key 306 to the key manager 220 to enroll the AE key 306. By way of example, the authorizing entity computer 108 can invoke an API call to call the key manager 220 (operating as part of the secure memory space 218 of FIG. 2) to enroll AE key 306. The API call (e.g., a message) may include a payload that includes the AE key 306. In some embodiments, the payload may additionally include a certificate. For example, certificate associated with the authorizing entity (e.g., $AE_{CERT}$ 308) may be included in the payload. The certificate associated with the authorizing entity may have been previously generated and signed by a certificate authority (not depicted) trusted by the key manager 220 using a private key associated with the certificate authority. As discussed above, the key manager 220 may be previously provisioned with the certificate authority's (CA's) public key 310. The certificate associated with the authorizing entity may include any suitable data from which the identity of the authorizing entity may be verified.

Upon receipt of the payload of the API call, or at another suitable time, the key manager 220 may be configured to perform one or more verification processes. For example, the key manager 220 may utilize the CA's public key 310 to verify the certificate ($AE_{CERT}$ 308). In other words, the CA's public key 310 may be utilized to verify the $AE_{CERT}$ 308 was generated by the certificate authority.

In some embodiments, the payload may further include a digital signature (e.g., denoted as "SIG" in FIG. 3A) that is generated by the authorizing entity computer 108 utilizing a private key associated with the authorizing entity. The key manager 220 may be configured to utilize the CA's public key 310 to obtain the public key of the authorizing entity from the $AE_{CERT}$ 308. The public key of the authorizing entity may then be utilized to verify the digital signature provided in the payload was provided by the authorizing entity computer 108. In some embodiments, the digital signature was generated by the authorizing entity computer 108 based on other payload data. For example, the AE key 306, or any portion of the payload data, may be signed by authorizing entity computer 108 using the private key associated with the authorizing entity to generate the digital signature. Thus, the public key associated with the authorizing entity and the digital signature may be utilized by the key manager 220 to verify the integrity of the message (e.g., that the payload data is unaltered and that the payload data was sent by the authorizing entity computer 108).

An exemplary payload provided by the authorizing entity computer 108 to the key manager 220 at step 2 is provided below.

Payload=<AE Key,$AE_{CERT}$,$Sign_{AE}$(AE Key)

where the "AE key" represents the AE key 306, the "$AE_{CERT}$" represents the $AE_{CERT}$ 308, and $Sign_{AE}$(AE Key) represents a digital signature of the AE key 306 as digitally signed by the authorizing entity computer 108 utilizing a private key associated with the authorizing entity.

At step 3, the key manager 220 may be configured to enroll the AE key 306. Enrolling the AE key 306 may include storing the AE key 306 within data store 224 of FIG. 2, a data store accessible to the key manager 220. In some embodiments, the key manager 220 may enroll/store the AE key 306 in response to determining verifying the identity of the authorizing entity associated with the authorizing entity computer 108 and/or in response to determining based on the digital signature that the message is unaltered. The key manager 220 may be configured to store an association between the public key of the authorizing entity and/or $AE_{CERT}$ 308, and of the AE key 306.

Although not depicted, the key manager 220 may be configured to provide a response message to the authorizing entity computer 108 to indicate the AE key provided to the key manager 220 was successfully enrolled. If, at any point in the method 300A, the key manager 220 determines that the provided AE key is not to be enrolled (e.g., the identity of the authorizing entity was unable to be verified), the key manager 220 may provide a response message to the authorizing entity computer 108 to indicate the AE key provided to the key manager 220 was not successfully enrolled The method 300B may be performed after the AE key 306 is successfully enrolled/stored by the key manager 220. The method 300B may begin at step 1, where a user may install an application on their user device 104. The user device 104 may generate a public/private key pair (e.g., key pair 320 comprising private key 322 and public key 324).

At step 2, the user device 104 may transmit the user specific data 326 and the user device's public key (e.g., public key 324) to the authorizing entity computer 108). User specific data 326 may include, for example, user demographics (e.g., user information such as name, address, phone number, banking account number, etc.) associated with the user of user device 104. The user device 104 may have been previously provisioned with the user specific data 326 via user input or any suitable means.

At step 3, the authorizing entity computer 108 may be configured to verify, in response to receiving the user specific data 326, the public key 324. If the user's identity is verified from the user specific data 326, the authorizing entity computer 108 may be configured to generate a certificate associated with the user device (e.g., $U_{CERT}$ 328). In some embodiments, the authorizing entity computer 108 may generate the certificate associated with the user device 104 by utilizing its own private key to digitally sign the public key associated with the user device 104 (e.g., the public key 324) and potentially any portion of the user specific data received at step 2. Accordingly, the certificate generated for the user device 104 may include the public key 324, and the user specific data 326 such as the user's name, address, phone number, banking account number, etc. If the user's identity cannot be verified, the authorizing entity computer 108 may transmit any suitable data to the user device 104 indicating enrollment was unsuccessful and/or the authorizing entity computer 108 may cease processing the data received from the user device 104.

At step 4, subsequent to verifying the user's identity, the authorizing entity computer 108 may be configured to generate a cryptographic key (e.g., K1 330). As an example, K1 330 may be generated utilizing, as input into the KDF 302, the AE key generated by the authorizing entity computer 108 during method 300A and the public key 324 received by the authorizing entity computer 108 at step 2. In some embodiments, the public key 324 may be hashed by the authorizing entity computer 108 using any suitable hashing algorithm. In some embodiments, the hash of the public key 324 may be provided with the AE key 206 as input in the KDF 302 to generate K1 330 (e.g., the output of the KDF 302). A function for generating K1 is described below.

$$K_1 = KDF(AE\ Key, H(Upub))$$

Where "K1" represents K1 330, "KDF" represents KDF 302, "AE key" represents AE key 306, and "H(Upub)" represents a hash value generated from inputting public key 324 (a public key associated with the user) into a hashing function "H." In some embodiments, the authorizing entity computer 108 may maintain a mapping including any suitable combination of $U_{CERT}$ 328, $AE_{CERT}$ 308, K1 330, user specific data 326, or the like.

At step 5, the authorizing entity computer 108 may transmit a message having a payload that includes $U_{CERT}$ 328, $AE_{CERT}$ 308, and K1 330. In some embodiments, the payload may further include a certificate associated with the certificate authority that was received by the authorizing entity computer 108 during performance of the method 300A. Upon receipt, or at another suitable time, the user device 104 may store the $U_{CERT}$ 328, $AE_{CERT}$ 308, and K1 330 in local memory.

Figure 4:
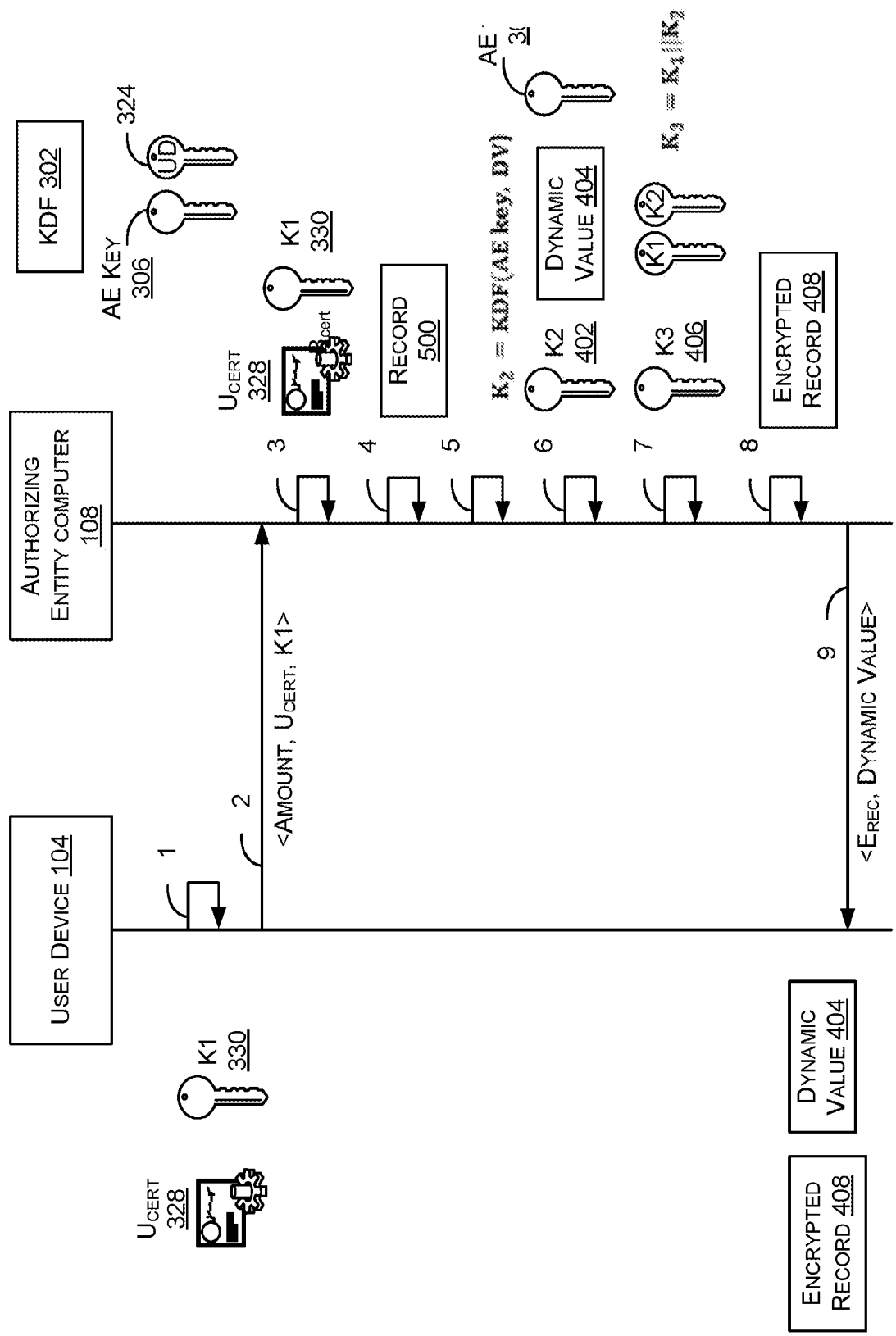
FIG. 4 illustrates a method for performing an operation (e.g., a load operation) utilizing an encrypted record, according to some embodiments.

FIG. 4 illustrates a method 400 for performing an operation (e.g., a load operation) utilizing an encrypted record, according to some embodiments. Method 400 may be performed after the methods 300A and 300B have concluded.

The method 400 may begin at step 1, the user device 104 may be utilized to launch an application. Any suitable interface of the application and/or the user device 104 may be utilized to indicate a request to perform an operation. As a non-limiting example, an interface of the application may be utilized to request an amount of $100 to be transferred to an account associated with the user. This account may be different from a financial account managed by the authorizing entity computer 108 on behalf of the user (e.g., a separate checking or savings account).

At step 2, the user device 104 may transmit a message (e.g., a load message of any suitable format) that includes a payload of the requested amount (e.g., $100), one or more certificates (e.g., the $U_{CERT}$ 328, $U_{CERT}$ 328 and $AE_{CERT}$ 308 of FIG. 3, etc.), and K1 330 received from performance of the method 300B of FIG. 3B.

At step 3, the authorizing entity computer 108 may be configured to verify the identity of the user device. As a non-limiting example, the authorizing entity computer 108 may utilize its own public key to verify that $U_{CERT}$ 328 was generated by the authorizing entity computer 108 utilizing its private key. Additionally, or alternatively, the authorizing entity computer 108 may verify (e.g., via the mapping discussed in connection with FIG. 3B) that K1 330 is associated with $U_{CERT}$ 328 (and/or $AE_{CERT}$ 308, if provided). In either case, if $U_{CERT}$ 328 was not generated by the authorizing entity computer 108 or K1 330 is unknown or not associated with $U_{CERT}$ 328, the authorizing entity computer 108 may be configured to reject the request. Otherwise, the method may continue to step 4.

At step 4, the authorizing entity computer 108 may be configured to identify whether or not the user's financial account (e.g., the banking account number of the $U_{CERT}$ 328) has a balance that exceeds the amount provided in the payload (e.g., $100) at step 2. If it does not, the authorizing entity computer 108 may transmit an indication to the user device 104 that its request is denied. Alternatively, if the balance of the financial account exceeds the amount provided in the payload, the authorizing entity computer 108 may perform any suitable operations to transfer the requested amount At step 5, if the balance of the financial account exceeds the amount provided in the payload, the authorizing entity computer 108 may generate a record associated with the user. FIG. 5 illustrates and exemplary record 500, according to some embodiments. Record 500 may be generated and associated with the user corresponding to $U_{CERT}$ 328 and/or the user device 104. The record 500 may be in any suitable format and comprise any suitable data. Returning to FIG. 4, the authorizing entity computer 108 may perform any suitable operations to transfer the requested amount from the user's financial account to another account (e.g., a transaction account, a digital wallet account) associated with record. The account associated with the record may be preexisting or may be generated as part of the operations performed by the authorizing entity computer 108. The authorizing entity computer 108 may modify the record 500 to include an entry associated with the requested operation. In the ongoing example, the authorizing entity computer 108 may generate modify the record 500 to include an entry comprising an amount (e.g., 100 indicating $100), the authorizing entity's public key, the user device's public key (e.g., public key 324 received during performance of the method 300B), and an indication of the type of operation performed (e.g., "load"). The entry may also include a digital signature (e.g., $AE_{SIG}$ of entry 1 of FIG. 5) generated by the authorizing entity by signing the remaining entry data using the private key of the authorizing entity. Entry 1 of FIG. 5 is intended to depict the entry added to the record 500 at step 5 of FIG. 4.

At step 6 of FIG. 4, the authorizing entity computer 108 may be configured to generate another cryptographic key (e.g., K2 402). In some embodiments, authorizing entity computer 108 may generate a dynamic value 404 (e.g., a nonce, a random number, a counter, any suitable unique value, etc.) and utilize dynamic value 404 and the AE key 306 as input into KDF 302 to generate K2 402. A function for generating K2 is provided below where, "K2" represents K2 402, "KDF" represents KDF 302, "AE key" represents AE key 306, and "DV" represents dynamic value 404 generated by authorizing entity computer 108.

$$K_2 = KDF(AE\ key, DV)$$

At step 7, the authorizing entity computer 108 may be configured to generate another cryptographic key (e.g., K3 406). K3 406 may, in some embodiments, be formed by concatenating K1 330 and K2 402.

At step 8, the authorizing entity computer 108 may generate encrypted record 408. By way of examples, the authorizing entity computer 108 may encrypt the record 500 using K3 406 by providing K3 406 and the record 500 as input in an encryption algorithm to obtain encrypted record 408.

At step 9, the authorizing entity computer 108 may transmit a message back to the user device in response to the request received at step 2. The message may include a payload comprising the encrypted record 408 and the dynamic value 404. Upon receipt, or at any suitable time, the user device 104 may store the encrypted record 408 and the dynamic value 404 in local memory. It should be appreciated that, according to the ongoing example, the encrypted record 408 comprises only an encrypted version of entry 1 of FIG. 5. It should be appreciated that the user device 104 may be configured to perform the above methods with any suitable number of authorizing entity computers, thus, it is contemplated that the user device 104 may store multiple encrypted records, each corresponding to a particular authorizing entity. The encrypted record 408, although stored at the user device 104, is protected as the user device 104 cannot access K2, nor has the ability to generate K2, and decryption of the encrypted record 408 requires both K1 and K2.

Figure 6:
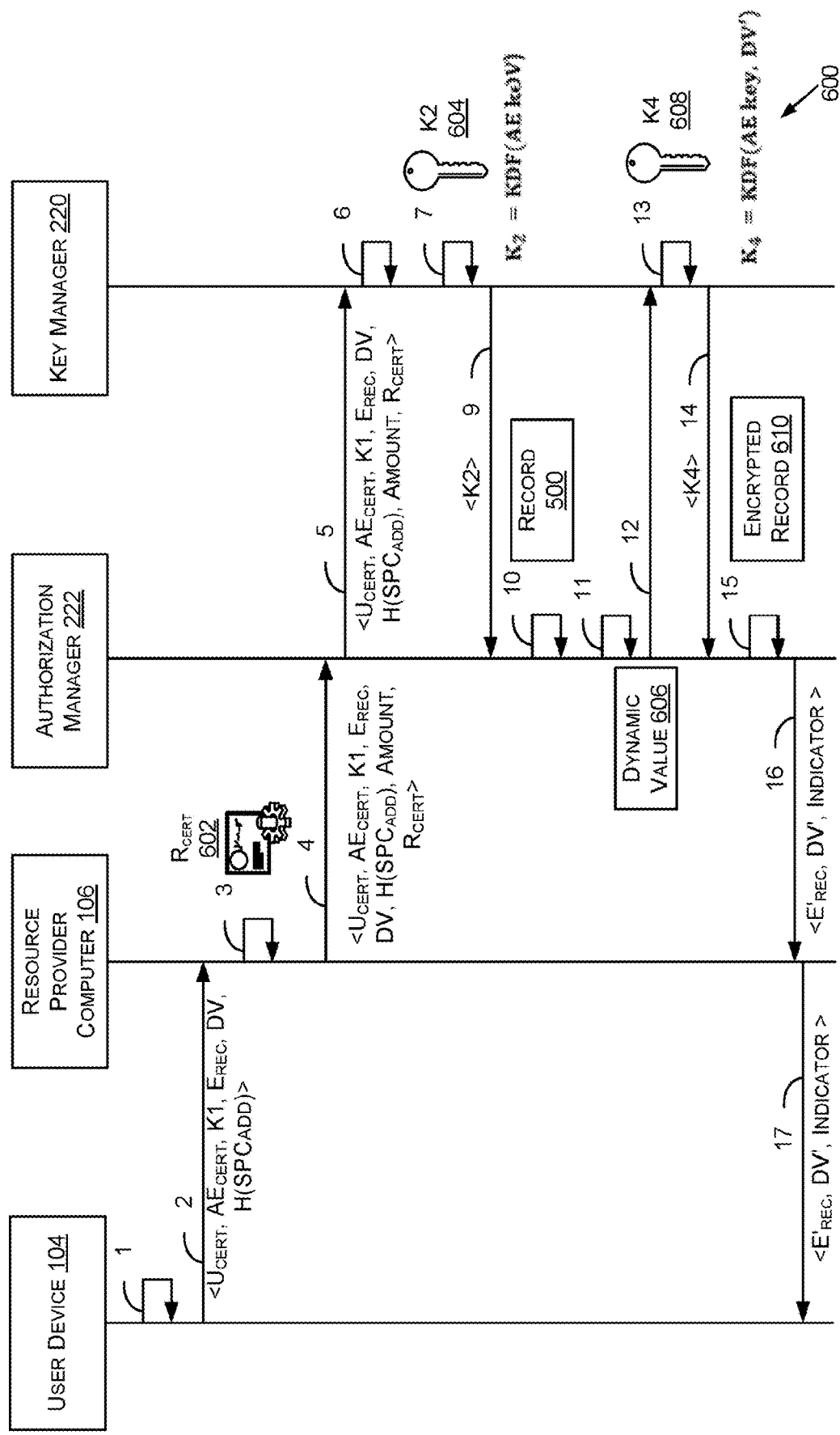
FIG. 6 illustrates another method for performing an operation (e.g., an authorization operation) utilizing an encrypted record, according to some embodiments.

FIG. 6 illustrates another method 600 for performing an operation (e.g., an operation associated with an authorization) utilizing an encrypted record (e.g., the encrypted record 408 of FIG. 4), according to some embodiments. The method 600 may be performed after the performance of method 400 of FIG. 4.

The method 600 may begin at step 1, where a user (e.g., the user 102 of FIG. 1) may launch an application on the user device 104 (e.g., a digital wallet application, a web browser, etc.). The user device 104 may be utilized to navigate to an interface provided/hosted by the authorizing entity or the resource provider. As non-limiting examples, the interface may be provided as part of the application (e.g., a digital wallet application) hosted by the authorizing entity (e.g., utilizing the authorizing entity computer 108 or a separate server computer) or the interface may be accessed at a website hosted by the resource provider (e.g., utilizing the resource provider computer 106. The user device may receive input provided via the interface. The input may indicate a request to perform an operation. By way of example, the input may indicate that the user wishes to spend $10 at a particular resource provider (e.g., a merchant associated with the resource provider computer 106). Accordingly, the request to perform an operation may be a request to authorize the $10 transaction between the user and the resource provider.

At step 2, the user device 104 may transmit, to the resource provider computer 106, a payload including one or more certifications (e.g., $U_{CERT}$ 328, $U_{CERT}$ 328 and $AE_{CERT}$ 308 of FIG. 3, etc.), a cryptographic key (e.g., K1 330 of FIG. 3), an encrypted record $E_{REC}$ (e.g., the encrypted record 408 of FIG. 4)), a dynamic value (e.g., the dynamic value 404 of FIG. 4), and $H(SPC_{ADD})$. The $H(SPC_{ADD})$ may represent a hash of the address of the secure processing computer (e.g., the secure processing computer 114) that will handle the transaction. In some embodiments, the user device 104 may be previously provisioned with a mapping indicating the address of the appropriate secure processing computer 114. For example, the mapping and/or the address of the secure processing computer 114 may be provided by the authorizing entity computer 108 of FIG. 3A as part of the performance of the method 300A. The secure processing computer 114 may be included within a larger network of secure processing computers. A hash table associated with the network may include identifiers for the secure processing computers and their corresponding addresses (IP addresses). Any message sent to this network of secure processing computers may be routed to the appropriate secure processing computer according to the identifier provided and the hash table.

At step 3, the resource provider computer 106 may attach its own certificate (e.g., $R_{CERT}$ 602, a certificate generated and digitally signed by the certificate authority that may be utilized to verify the identity of the resource provider) and an amount of the transaction (e.g., $10) to the payload.

At step 4, the resource provider computer 106 may forward the modified payload to the authorization manager 222. In the example provided in FIG. 6, the authorization manager 222 may execute in a secure memory space (e.g., the secure memory space 218 of FIG. 2). The key manager 220 of FIG. 6 may execute in the same or different secure memory space of the secure processing computer on with the authorization manager 222 executes, or the key manager 220 may operate in a separate memory space provided on a separate secure processing computer for which the address is known to the authorization manager 222.

At step 5, the authorization manager 222 may request a cryptographic key from key manager 220. The authorization manager 222 may include any suitable portion of the payload received at step 4 in the request.

At step 6, in response to the request provided by the authorization manager 222, the key manager 220 may verify any suitable combination of the certificates provided in the payload. As a non-limiting example, the key manager 220 may retrieve a public key of the certificate authority from local memory. Using the public key of the certificate authority (e.g., CA's public key 310 of FIG. 3), the key manager 220 may verify that $AE_{CERT}$ 308 provided in the payload data was originally generated by the certificate authority. The CA's public key 310 may also be utilized to extract from the $AE_{CERT}$ 308, the public key associated with the authorizing entity (or any suitable data included in $AE_{CERT}$ 308). Using the public key of the authorizing entity, the key manager 220 may verify that $U_{CERT}$ 328 provided in the payload data was originally generated by the authorizing entity. The public key of the authorizing entity may also be utilized to extract the user specific data 326 and public key associated with the user device 104 from the $U_{CERT}$ 328. Using the public key of the certificate authority (e.g., CA's public key 310 of FIG. 3), the key manager 220 may verify that $R_{CERT}$ 602 provided in the payload data was originally generated by the certificate authority and extract any suitable data provided in $R_{CERT}$ 602.

At step 7, the key manager 220 may generate K2 604. The key manager 220 may generate K2 604 in the same manner as K2 402 was generated by the authorizing entity computer 108 as described in connection with FIG. 4. Specifically, the key manager 220 may utilize the public key of the authorizing entity (or $AE_{CERT}$ 308) to retrieve the enrolled key associated with the authorizing entity (e.g., AE key 306 of FIG. 3) using the mapping generated during the performance of method 300A. The key manager 220 may then generate K2 604 using the following function, where "KDF" represents KDF 302 of FIGS. 3 and 4, "AE key" represents AE key 306, and "DV" represents the dynamic value provided in the payload data (e.g., dynamic value 404).

$$K_2 = KDF(AE\ key, DV)$$

In some embodiments, the key manager 220 may be configured to maintain a list of previously used dynamic values. The key manager 220 may verify that the dynamic value 404 has not been previously utilized by the key manager 220 to generate a cryptographic key. This enables the key manager 220 to prevent relay and/or replay attacks by ensuring a different dynamic value must accompany each request. If the key manager 220 identifies that the dynamic value 404 has previously been utilized, K2 604 may not be generated and key manager 220 may return an indicator of the same to the authorization manager 222, which in turn may reject the request of the user device 104. If the dynamic value has not been utilized by the key manager 220 to generate a cryptographic key, then K2 604 may be generated. Once K2 604 is generated, it may be returned to the authorization manager 222 at step 9.

At step 10, the authorization manager 222 may be configured to decrypt the encrypted record (e.g., $E_{REC}$ of the payload data) to obtain a plaintext record (e.g., the record 500 which includes entry 1 as depicted in FIG. 5, but not entries 2-6). By way of example, the authorization manager 222 may concatenate K1 provided in the payload data with K2 provided from the key manager 220 at step 9, to generate a cryptographic key K3 (e.g., a same cryptographic key as K3 406 of FIG. 4). K3 may be utilized to decrypt the encrypted record $E_{REC}$ to obtain record 500.

At step 11, the authorization manager 222 may aggregate all the amounts for entries of record 500 associated with a first type of operation (e.g., "L" entries corresponding to previously conducted load operations) to determine a first value (e.g., a total amount for all the entries associated with an "L" operation). Prior to aggregating the amounts for the first type of operations, the authorization manager 222 may first verify the data of each entry has not been modified by utilizing the public key of the authorizing entity (AEpub-key of entry 1) and the digital signature of each entry of the first type of operation (e.g., $AE_{SIG}$ of entry 1). So long as each of those entries is determined to be unmodified, the authorization manager 222 may proceed to aggregating the amounts for the first types of operations.

The authorization manager 222 may also aggregate all of the amounts for entries of the record 500 associated with a second type of operation (e.g., "S" entries corresponding to previously conducted spend operations) to determine a second value (e.g., a total amount for all the entries associated with an "S" operation). The authorization manager 222 may determine whether or not the first value is greater than or equal to the sum of the second value and the amount provided in the payload data. If so, the authorization manager 222 may determine the request is authorized and the requested operation should be performed. Accordingly, the authorization manager may append any suitable portion of the payload data (e.g., the amount), the public key of the authorizing authority, the public key of the user device 104, and the public key of the resource provider, to the record 500. By way of example, the authorization manager 222 may append entry 2 of FIG. 5 to the record 500. The record 500 at this time includes entry 1 and 2 of FIG. 5, but not entries 3-6.

At step 12, the authorization manager 222 may be configured to generate a new dynamic value (e.g., dynamic value 606) using any suitable method. The authorization manager 222 may send the dynamic value 606 to the key manager 220.

At step 13, the key manager 220 may generate a new cryptographic key (e.g., K4 608) using the dynamic value 606 and the AE key 308 associated with the authorizing entity according to the following formula, where "KDF" represents KDF 302, "AE key" represents AE key 308, and "DV" represents dynamic value 606.

$$K_4 = KDF(AE\ key, DV')$$

Alternatively, the authorization manager 222 may simply generate a request for a new encryption key to the key manager 220 and key manager 220 may generate dynamic value 606 as part of the process for generating K4 608.

At step 14, the key manager 220 may return K4 608 to authorization manager 222.

At step 15, the authorization manager 222 may utilize K4 608 to encrypt the record 500 as modified (e.g., the record 500 including entries 1 and 2). In some embodiments, the authorization manager 222 may generate a new cryptographic key by concatenating K1 from the payload data originally received at step 4 and K4 608. The authorization manager 222 may use the new cryptographic key it generated through the concatenation to encrypt the record 500 as modified at step 10 to generate encrypted record 610. The encrypted record 610 may be an encrypted version of the record 500 that includes entries 1 and 2 of FIG. 5.

At step 16, the authorization manager 222 may transmit $E'_{REC}$ (e.g., encrypted record 610), DV' (e.g., dynamic value 606), and an indicator to the resource provider computer 106, which in turn may forward the same data to the user device 104. In some embodiments, the indicator may be utilized to indicate that the operation requested was successful or unsuccessful. In the ongoing example, the indicator may indicate that the operation was successful (e.g., $10 was spent at the resource provider 1 associated with Rpub_key 1 as indicated in entry 2 of the record 500).

Subsequently, the method 400 and/or the method 600 can be repeated any suitable number of times to increase the balance of the user's transaction account by loading additional amounts to the record or to spend an additional amount at a resource provider, respectively. For each subsequent successful operation (e.g., a load or a spend), a new entry may be appended to the record 500, and a new dynamic value may be generated (by the computer performing the operation) and used to generate new cryptographic keys with which a new encrypted version of the record 500 may be generated. By transmitting the newly encrypted record with the dynamic value used to generate the encryption key(s) that were user to generate the encrypted record, the recipient (e.g., the authorizing entity computer 108 fora load operation, the authorization manager 222 for a spend operation) may be enabled to derive/generate the key(s) that were used to encrypt the record. Accordingly, the recipient is then enabled to decrypt the encrypted record as part of performing the requested operation as described in the above figures. The record 500, as depicted in FIG. 5 includes additional entries to illustrate modifications to the record 500 due to subsequent operations.

For example, continuing with the example above, the user may subsequently request a load operation in the amount of $20. The authorizing entity computer 108 may receive the request, verify funds associated with the banking account number of the user, decrypt the encrypted record provided by the user device 104, modify the decrypted record (e.g., record 500) to include entry 3, generate a new dynamic value, generate a new cryptographic key using the AE key and the new dynamic value, encrypt the record 500 including entries 1-3 with the newly generate cryptographic key, and send the new dynamic value and the newly encrypted record to the user device 104 for storage.

At a subsequent time, the user may request a spend operation in the amount of $30 at a resource provider 2. This may cause the authorization manager 222 to perform the method 600 once again. In summary, the authorization manager 222 may provide the payload data of the request to the key manager 220, including the dynamic value generated by the authorizing entity computer 108. The key manager 220 may generate the key(s) using the dynamic value provided and the AE key 308 (the key provided by the authorizing entity computer 108 during performance of the method 300A). The keys may be utilized to decrypt the encrypted record. The authorization manager 222 may perform the method described in connection with step 11 of FIG. 6 to determine whether the aggregate of the load operations is greater than or equal to the sum of the aggregate of the spend operations and the amount indicated in the current request. If so, the authorization manager 222 may generate a new dynamic value, request a new cryptographic key from the key manager 220, append entry 4 to the record 500 and encrypt the record 500 as modified to include entries 1-4. The encryption may utilize a key comprising a concatenation of K1 and the new cryptographic key provided by the key manager 220. The authorization manager 222 may then transmit the new dynamic value and the newly encrypted record to the user device 104 for storage. Each new dynamic value received may replace the previous dynamic value stored at the user device 104. Similarly, each newly encrypted record received at the user device 104 may replace an encrypted record previously stored by the user device 104.

The methods 400 and 600 may be subsequently performed any suitable number of times in any suitable order.

At a subsequent time, the authorization manager 222 (having performed a number of transaction corresponding to one or more users and one or more resource providers) may be configured to determine the amount to be debited from each user and how much is to be credited to each resource provider. This information may then be provided to a settlement service, which may transfer the appropriate amounts between the financial institutions representing the users (e.g., the authorizing entity associated with authorizing entity computer 108) and the financial institutions representing the resource provider (e.g., the transport computer 110 associated with the financial institution that manages a financial account on behalf of the resource provider). In some embodiments, a blockchain system may be used in this settlement process.

Although example provided herein are provided in the context of payment transactions (e.g., a funds transfer conducted between an authorizing entity bank and a user account, a payment transaction between the user and a resource provider such as a merchant), it should be appreciated that the techniques described herein may be utilized in context other that payment authorization system. By way of example, the encrypted record stored by the user device 104 of the figures above, in some embodiments, may include entries providing any suitable operation data. As a non-limiting example, the user device 104 may be used to request access to a resource (e.g., electronic software, a service, etc.) provided by a resource provider. The resource provider's unique key may be enrolled with a key manager operating on a secure processing computer.

Each time the user requests access (a request to perform an operation), details of the access (e.g., information about the user, the user's device, a location of the user device, an access time, an access durations, etc.) may be appended to a record, encrypted using the methods discussed above (e.g., utilizing the resource provider's unique key and a dynamic value), and transmitted to the user device for stored. Each time the user requests access, an authorization manager operating on a secure processing computer may be configured to receive the request. The authorization manager may be configured to decrypt the record received in the request to determine whether the user is to be allowed access. As an example, the authorization manager may analyze any suitable data contained in the decrypted record to determine whether the user is to be allowed access to the resource. The user device may be provided access according to this determination. If the user is allowed access, or denied access, the authorization manager may be configured to append data associated with the request and/or output to the record. The authorization manager may then, in the manner described above, request one or more encryption keys from the key manager and utilize at least one of the keys (e.g., derived from the unique key associated with the resource provider and a dynamic value) to encrypt the record. The encrypted record may then be transmitted back to the user device for storage.

TECHNICAL ADVANTAGES

Embodiments of the invention have a number of advantages. For example, authorization of transactions is much faster and less complex than conventional authorization processing that uses messages that are transmitted to the issuer via an acquirer computer and a processing network computer. Since messages do not need to traverse as many components, embodiments of the invention provide for faster processing speeds. In addition, the process is also secure and precludes double spending as noted above. Further, the record is encrypted on the user device such that the entries of the record are not accessible to the user device which may prevent fraudulent modifications to the record. Each user device can store its own encrypted record of previously performed operations (e.g., load and/or spend operations/transactions), thereby precluding the need to utilize the conventional authorization processing. Rather, the faster authorization process may be utilized as described in the figures above.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents. It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software. Any of the software components or functions described in this application, may be implemented as software code to be executed by a processor using any suitable computer language such as, for example, Java, C, C++, Python or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems may be interconnected via a system bus. Additional subsystems such as a printer, a keyboard, one or more storage device(s), a monitor, which is coupled to a display adapter, and others may be utilized. Peripherals and input/output (I/O) devices, which couple to I/O controller, can be connected to the computer system by any number of means known in the art such as input/output (I/O) port (e.g., USB, FireWire). For example, I/O port or external interface (e.g. Ethernet, Wi-Fi, etc.) can be used to connect a computer system to a wide area network such as the Internet, a mouse input device, or a scanner. The interconnection via system bus may allow the central processor to communicate with each subsystem and to control the execution of instructions from system memory or storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors that can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated.

What is claimed is:

1. A computer-implemented method, comprising:
   receiving, by a resource provider computer from a user device, a request to perform an operation, the request comprising an encrypted record and data corresponding to an address for a secure processing computer, the encrypted record comprising one or more entries corresponding to one or more previously performed operations associated with a user of the user device;
   generating, by the resource provider computer, a modified request based at least in part on adding a resource provider certificate associated with the resource provider computer to the request received from the user device;
   identifying the address for the secure processing computer from a mapping using the data received in the request, the mapping indicating a plurality of number ranges and respective addresses, the address being identified based on determining a number range of the mapping that corresponds to the data received in the request;
   forwarding, by the resource provider computer to the secure processing computer, the modified request using the address identified for the secure processing computer wherein forwarding the modified request causes the secure processing computer to authorize the operation using the encrypted record and the resource provider certificate associated with the resource provider computer, the operation being performed based at least in part on authorization;

receiving, by the resource provider computer from the secure processing computer, a modified encrypted record comprising a new entry corresponding to performance of the operation; and transmitting, by the resource provider computer to the user device, the modified encrypted record and an indication that the operation was performed.

2. The computer-implemented method of claim 1, wherein the request further comprises a first dynamic value generated by the user device, a second certificate associated with the user device, a third certificate associated with an authorizing entity computer, and a first cryptographic key generated by the authorizing entity computer.

3. The computer-implemented method of claim 2, wherein forwarding the modified request further causes the secure processing computer to authorize the operation using at least one of: the first dynamic value, the second certificate associated with the user device, the third certificate associated with the authorizing entity computer, or the first cryptographic key generated by the authorizing entity computer.

4. The computer-implemented method of claim 2, wherein the modified encrypted record is encrypted based at least in part on a second cryptographic key generated by the secure processing computer using a second dynamic value generated by the secure processing computer.

5. The computer-implemented method of claim 4, wherein the second cryptographic key is generated by the secure processing computer using the first cryptographic key received in the modified request.

6. The computer-implemented method of claim 1, wherein generating the modified request further comprises adding, by the resource provider computer, an amount corresponding to the operation to the request received from the user device.

7. The computer-implemented method of claim 6, wherein forwarding the modified request further causes the secure processing computer to authorize the request based at least in part on the amount added by the resource provider computer.

8. The computer-implemented method of claim 1, wherein the secure processing computer is configured to authorize the request based at least in part on:
generating a decrypted record from the encrypted record using data obtained from the modified request;
aggregating a first set of entries of the decrypted record to generate a first value; and
aggregating a second set of entries of the decrypted record to generate a second value, wherein the operation is authorized based at least in part on the first value and the second value.

9. The computer-implemented method of claim 1, wherein the resource provider certificate has been previously generated and digitally signed by a certificate authority.

10. The computer-implemented method of claim 1, wherein the modified request is forwarded to an authorization manager of the secure processing computer, the authorization manager being executed within a secure memory space.

11. A resource provider computer, comprising:
one or more processors: and
one or more memories storing computer-executable instructions that, when executed by the one or more processors, causes the resource provider computer to:

receive, from a user device, a request to perform an operation, the request comprising an encrypted record and data corresponding to an address for a secure processing computer, the encrypted record comprising one or more entries corresponding to one or more previously performed operations associated with a user of the user device;

generate a modified request based at least in part on adding a resource provider certificate associated with the resource provider computer to the request received from the user device;

identify the address for the secure processing computer from a mapping using the data received in the request, the mapping indicating a plurality of number ranges and respective addresses, the address being identified based on determining a number range of the mapping that corresponds to the data received in the request;

forward, to the secure processing computer, the modified request using the address identified for the secure processing computer, wherein forwarding the modified request causes the secure processing computer to authorize the operation using the encrypted record and the resource provider certificate associated with the resource provider computer, the operation being performed based at least in part on authorization;

receive, from the secure processing computer, a modified encrypted record comprising a new entry corresponding to performance of the operation; and transmit, to the user device, the modified encrypted record and an indication that the operation was performed.

12. The resource provider computer of claim 11, wherein the data received in the request comprises a hash value of the address of the secure processing computer, and wherein executing the computer-executable instructions further causes the resource provider computer, when the data received in the request comprises the hash value, to identify the address for the secure processing computer to which to forward the modified request based at least in part on the hash value of the address of the secure processing computer received in the request.

13. The resource provider computer of claim 11, wherein the request further comprises a first cryptographic key generated by the user device, wherein a second cryptographic key generated by the secure processing computer is received with the modified encrypted record, and wherein the second cryptographic key is transmitted to the user device with the modified encrypted record and the indication that the operation was performed.

14. The resource provider computer of claim 13, wherein the request further comprises a first dynamic value generated by the user device, and wherein the second cryptographic key is generated based at least in part on the first dynamic value.

15. The resource provider computer of claim 14, wherein a second dynamic value generated by the secure processing computer is received with the modified encrypted record.

16. The resource provider computer of claim 11, wherein the indication indicating the operation was performed is received from the secure processing computer with the modified encrypted record.

17. The resource provider computer of claim 11, wherein the request is associated with performing an online transaction.

18. The resource provider computer of claim 11, wherein the request is initiated from an interface hosted by the resource provider computer.

19. The resource provider computer of claim 11, wherein executing the computer-executable instructions further causes the resource provider computer to store the mapping indicating the plurality of number ranges, each number range being individually associated with one of a plurality of secure processing computers and corresponding internet protocol addresses for each of the plurality of secure processing computers.

20. The resource provider computer of claim 11, wherein the one or more entries of the encrypted record related to operations that have been previously performed by an authorizing entity computer or a given secure processing computer.

21. A computer-implemented method, comprising:
    receiving, by a resource provider computer from a user device, a request to perform an operation, the request comprising an encrypted record and a hash value of an address for a secure processing computer, the encrypted record comprising one or more entries corresponding to one or more previously performed operations associated with a user of the user device;
    generating, by the resource provider computer, a modified request based at least in part on adding a resource provider certificate associated with the resource provider computer to the request received from the user device;
    identifying the address for the secure processing computer based at least in part on the hash value received in the request;
    forwarding, by the resource provider computer to the secure processing computer, the modified request using the address identified for the secure processing computer wherein forwarding the modified request causes the secure processing computer to authorize the operation using the encrypted record and the resource provider certificate associated with the resource provider computer, the operation being performed based at least in part on authorization;
    receiving, by the resource provider computer from the secure processing computer, a modified encrypted record comprising a new entry corresponding to performance of the operation; and
    transmitting, by the resource provider computer to the user device, the modified encrypted record and an indication that the operation was performed.

* * * * *